United States Patent [19]

Koch

[11] Patent Number: 4,614,355
[45] Date of Patent: Sep. 30, 1986

[54] FIFTH-WHEEL ASSEMBLY

[76] Inventor: Richard L. Koch, 7129 N. 69th Ave., Glendale, Ariz. 85303

[21] Appl. No.: 612,145

[22] Filed: May 21, 1984

[51] Int. Cl.⁴ .............................................. B62D 53/08
[52] U.S. Cl. .................................... 280/438 R; 116/4;
 280/407; 280/477; 307/10 R; 340/70
[58] Field of Search ............... 280/438, 439, 440, 441,
 280/414.1, 475, 477, 762, 766.1, 432, 407;
 116/28 A, 28 R, 67 R; 293/117; 33/264;
 340/61, 52 R, 686, 70, 687; 200/61.44; 307/10
 R; D12/162

[56] References Cited

U.S. PATENT DOCUMENTS

| | | | |
|---|---|---|---|
| 2,387,625 | 10/1945 | Walther et al. | 340/52 R |
| 3,424,107 | 1/1969 | Rollins | 116/67 R |
| 3,494,632 | 2/1970 | Bostrom | 280/438 R |
| 3,535,679 | 10/1970 | Connors | 340/687 X |
| 4,237,446 | 12/1980 | Roberts | 340/61 |
| 4,429,892 | 2/1984 | Frampton et al. | 280/438 R X |
| 4,432,563 | 2/1984 | Pitcher | 340/686 X |

Primary Examiner—David M. Mitchell
Assistant Examiner—Mitchell J. Hill
Attorney, Agent, or Firm—Don J. Flickinger

[57] ABSTRACT

A slidable fifth-wheel assembly permitting the relative positions of a tractor and its associated trailer to be adjusted includes switching means which activates an alarm in the cab of the tractor when the fifth-wheel reaches a desired position. This desired position is a trade-off between rear axle weight and drive axle weight. The switching mechanism includes a switch mounted on the base plate of the fifth-wheel assembly. The actuator arm of the switch is extended by means of a coil spring which is engaged and displaced by the coupling shoe of the fifth-wheel assembly.

6 Claims, 5 Drawing Figures

U.S. Patent    Sep. 30, 1986    4,614,355
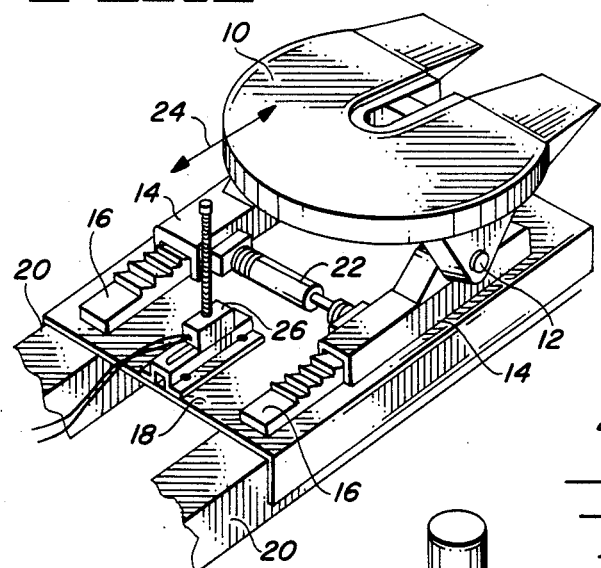
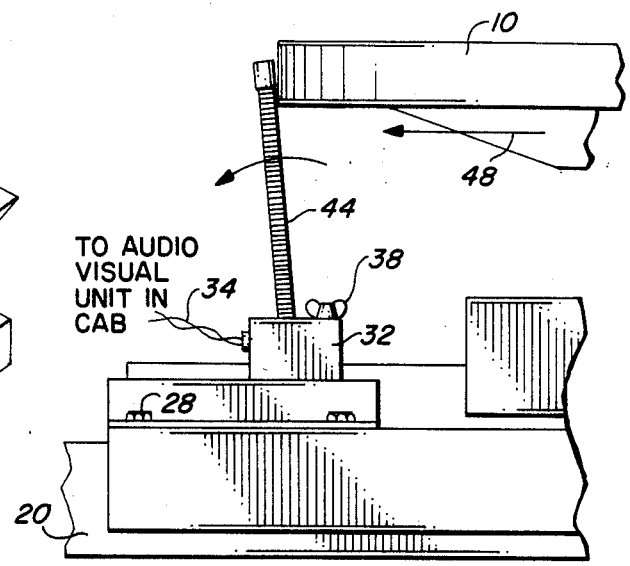
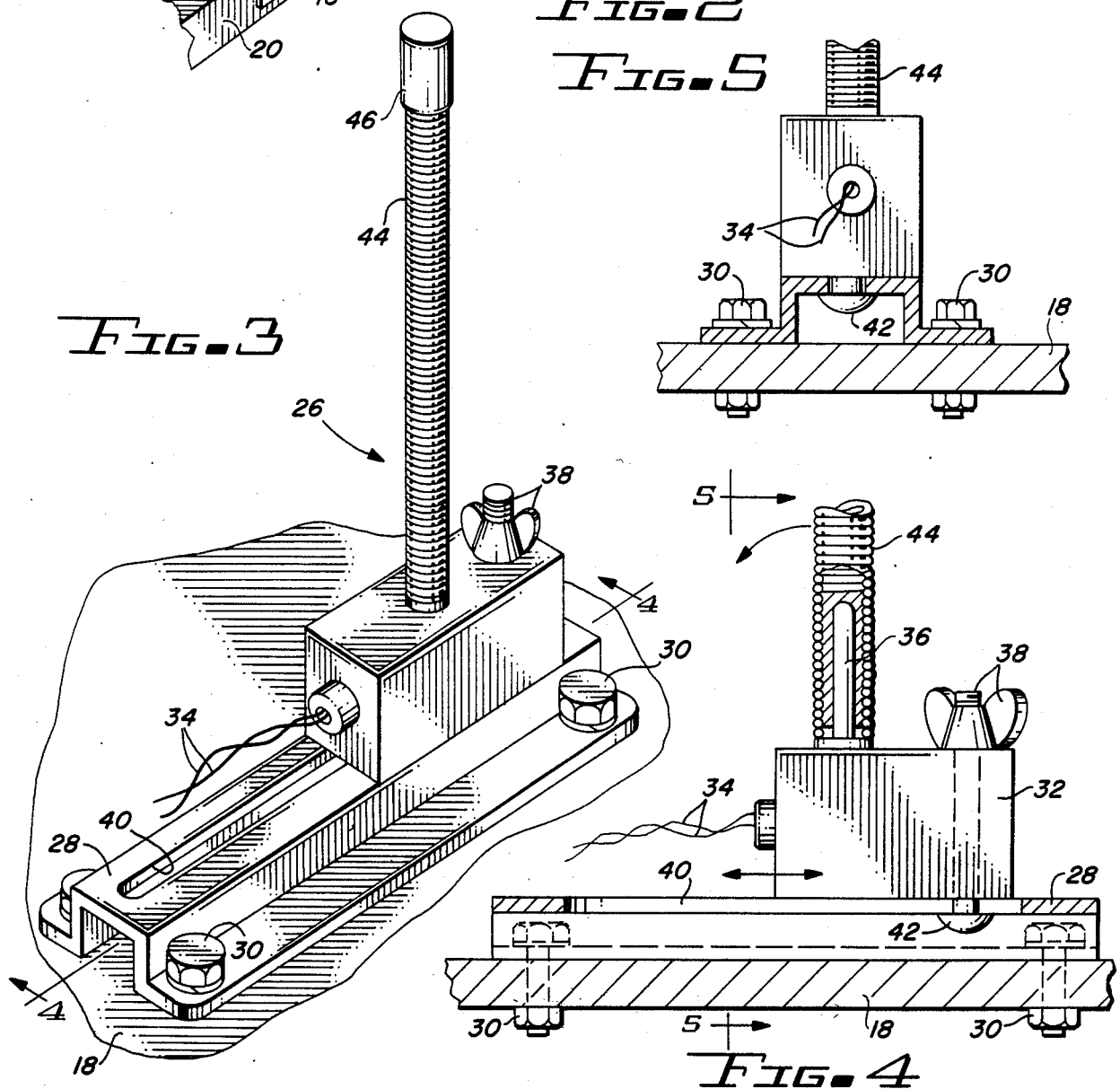

FIFTH-WHEEL ASSEMBLY

BACKGROUND OF THE INVENTION

1. Field of the Invention

This invention relates generally to fifth-wheel assemblies for coupling trailers to tractors and, more particularly, to an improved sliding fifth-wheel assembly which will automatically inform the operator of the vehicle when the trailer is positioned relative to the tractor so as to produce a desired drive axle weight to steering axle weight ratio.

2. Prior Art

It is well-known that by moving a trailer forward with respect to its associated tractor, the weight on the tractor's drive-axle will decrease and the weight on the steering axle will increase. While this results in better steering traction when driving under slippery road conditions, it requires greater steering effort on the part of the operator. In contrast, moving the trailer rearward with respect to its associated tractor will increase drive axle (rear axle) weight and decrease the weight on the steering axle. This reduces the effort required for steering and results in a softer ride for the operator. For this reason, fifth-wheels have been developed which include a lower half (i.e., that half which is fixed to the tractor) which may be either manually or pneumatically moved forward or rearward. This provides maximum tractor utilization for various lengths and types of trailers under various road conditions.

Adjustment is usually made by first either manually or pneumatically releasing a locking mechanism which secures the coupling shield thus permitting it to move either forward or rearward, setting the brakes on the trailer, driving the tractor forward or rearward until the tractor and trailer achieve a desired relationship, and then locking the fifth-wheel in place. Unfortunately, this process has, in the past, required that the fifth-wheel be visually monitored during the adjustment process in order to determine when the desired position and therefore the desired weight distribution has been achieved.

SUMMARY OF THE INVENTION

It is an object of the present invention to provide an improved fifth-wheel assembly for coupling trailers and tractors.

It is a further object of the present invention to provide an adjustable fifth-wheel assembly for tractor-trailers so as to permit redistribution of trailer weight on the drive and steering axles of the tractor.

It is a still further object of the present invention to provide an improved fifth-wheel assembly which will result in the automatic generation of an alarm or indication to the operator of the vehicle when the fifth-wheel (and therefore the trailer) has achieved a desired position with respect to the tractor.

According to a broad aspect of the invention there is provided an improved fifth-wheel assembly for use on a tractor having a frame, a cab, a drive axle and a steering axle comprising, a mounting plate fixedly coupled to the frame of the tractor, a coupling assembly slideably mounted on a mounting plate and capable of being moved in forward and rearward directions, and means coupled to the mounting plate for triggering an alarm signal when the coupling assembly has been moved to a desired position.

The above and other objects, features and advantages of the present invention will be more clearly understood from the following detailed description taken in conjunction with the accompanying drawings, in which:

BRIEF DESCRIPTION OF THE DRAWINGS

FIG. 1 is a perspective view of the bottom half of the inventive fifth-wheel assembly;

FIG. 2 is a side view illustrating the technique utilized in the inventive fifth-wheel assembly;

FIG. 3 is a perspective view of the position monitoring apparatus utilized on the inventive fifth-wheel assembly;

FIG. 4 is a cross-sectional view of the positional apparatus shown in FIG. 3 taken along the line 4—4; and FIG. 5 is a cross-sectional view of the positional detection apparatus shown in FIG. 4 taken along the line 5—5.

DESCRIPTION OF THE PREFERRED EMBODIMENT

Referring to FIG. 1, the inventive fifth-wheel assembly includes a coupling shoe 10 which is pivotably coupled at 12 to first and second slide brackets 14. These slide brackets each have a longitudinal channel therethrough and are capable of translational movement on notched tracks 16. These notched tracks are fixedly coupled to a base plate 18 which in turn may be fixedly coupled to the tractor's frame 20. A release mechanism 22 is provided which, when released by the operator, permits channeled brackets 14 to move on tracks 16 in either a forward or rearward direction as is indicated by arrow 24. When mechanism 22 is locked by the operator, brackets 14 and therefore shoe 10 are longitudinally fixed on tracks 16. Mechanism 22 may be either manually operated or it may be pneumatic.

Sliding fifth wheels of the type just described are well known. For example, a fifth-wheel of the type just described including a pneumatic release mechanism 22 may be purchased from Holland, a manufacturer of fifth-wheels, and bears part number 2500-HV-36. Holland also manufactures a fifth-wheel of the type above-described where locking mechanism 22 is manual. This apparatus bears part number 2500-HAF-36.

Also mounted on base plate 18 is an assembly 26 (shown in more detail in FIG. 3) which initiates a visual or audible signal in the cab of the tractor when the fifth-wheel has been moved to a desired position. Referring to FIG. 3, assembly 26 includes a bracket 28 secured by means of nut and bolt assembly 30 to base plate 18. As is shown in FIGS. 3, 4, and 5, a switch 32 (e.g. a microswitch) including wires 34 and an actuator arm 36 is mounted on bracket 28 by means of a screw and wing-nut assembly 38 which rides in a longitudinal slot 40 in the upper portion of bracket 28. That is, head 42 of the wing-nut assembly 38 is wider than the width of slot 40. Therefore, when the wing-nut assembly is loosened, switch 32 may be positioned anywhere along slot 40. When a desired position has been achieved, the wing-nut assembly is again tightened to secure switch 32 in its desired position.

A flexible coil spring 44 equipped with a cap 46 is positioned over actuator arm 36 of switch 32 and is secured to an upper portion of switch 32. Coil spring 44 must have sufficient resiliency so as to be bent enough to cause actuator arm 36 to switch the state of switch 32 and then resume its upright position when the stress is removed. While a coil spring has been shown for this purpose, any apparatus which exhibits the required resiliency and durability may be employed.

FIG. 2 illustrates the operation of the inventive fifth-wheel assembly. It is first assumed that switch 32 and therefore coil spring 44 has been adjusted to reside in a desired position on bracket 28 in the manner previously described. If it is desired, for example, to improve steering traction due to adverse road conditions, the trailer must be moved forward as is indicated by arrow 48. When shoe 10 engages and displaces coil spring 44 by a sufficient amount, actuator arm 36 of switch 32 will cause the state of the switch to change permitting current to flow in the circuit of which switch 32 and wires 34 are a part. Also in the circuit is a source of power and a visual or audible alarm in the cab of the tractor which will be energized indicating to the operator that the trailer is now properly positioned on the tractor to achieve a desired weight distribution between the tractor's drive and steering axles. When road conditions improve, the position of the trailer with respect to the tractor may simply be readjusted until the audible or visual alarm ceases. This will occur when shoe 10 moves rearward permitting coil spring 44 to move towards its normal unstressed position permitting switch to turn off.

The above description is given by way of example only. Changes in form and details may be made by one skilled in the art without departing from the scope of the invention as defined by the appended claims.

I claim:

1. An improved fifth wheel assembly for use on a tractor having a frame, a cab, a drive axle and a steering axle, comprising:

a mounting plate fixedly coupled to the frame of said tractor;
   a coupling assembly slideably mounted on said mounting plate and capable of being moved in forward and rearward directions; and
   adjustably positional first means coupled to said mounting plate for triggering an alarm signal when said coupling assembly has been moved to a desired position, said first means including
   a mounting bracket fixedly coupled to said mounting plate,
   switch means coupled to said mounting bracket, and
   second means coupled to said switch means and responsive to movement of said coupling assembly for triggering said switch means.

2. An improved fifth-wheel assembly according to claim 1 wherein said mounting bracket has a longitudinal slot therein to permit said switch means to be slideably positioned on said mounting bracket.

3. An improved fifth-wheel assembly according to claim 2 further comprising third means for locking said switch means in a desired position on said mounting bracket.

4. An improved fifth-wheel assembly according to claim 3 wherein said switch means includes an actuator arm assembly which extends to a point where it may be engaged and displaced by said coupling assembly.

5. An improved fifth-wheel assembly according to claim 4 wherein said actuator arm assembly comprises a flexible extension coupled so as to be engaged and displaced by said coupling assembly.

6. An improved fifth-wheel assembly according to claim 5 wherein said flexible extension is a coiled spring.

* * * * *